United States Patent [19]

Smith et al.

[11] 4,340,079

[45] Jul. 20, 1982

[54] ENERGY DISSIPATING PIPELINE SURGE RELIEF SYSTEM

[75] Inventors: Bryan Smith, Rawdon; Andrew E. Keech, Roundhay; Patricia A. Dawson, Gledhow, all of England

[73] Assignee: Grove Valve and Regulator Company, Oakland, Calif.

[21] Appl. No.: 149,701

[22] Filed: May 14, 1980

Related U.S. Application Data

[63] Continuation-in-part of Ser. No. 80,074, Sep. 28, 1979, abandoned.

[30] Foreign Application Priority Data

Feb. 15, 1980 [GB] United Kingdom ............... 80005189

[51] Int. Cl.³ .................................................. G05D 11/13
[52] U.S. Cl. ..................................... 137/207; 137/568; 138/26; 251/61.1
[58] Field of Search ............... 137/207, 568, 115, 116; 138/26; 417/543; 251/61.1

[56] References Cited

U.S. PATENT DOCUMENTS

| | | | |
|---|---|---|---|
| 2,565,374 | 8/1951 | Kitchel | 417/453 X |
| 2,896,862 | 7/1959 | Bede | 138/26 X |
| 3,148,745 | 9/1964 | Jones | 137/207 X |
| 3,157,202 | 7/1964 | Sadler | 138/26 |
| 3,911,941 | 10/1975 | Gerbic | 251/61.1 X |

*Primary Examiner*—Alan Cohan
*Attorney, Agent, or Firm*—Melvin R. Stidham

[57] ABSTRACT

A pressure surge relief system for a liquid transporting pipeline, comprising a surge relief line adapted to be tapped from the pipeline. The relief line includes a valve which is conditioned to open quickly to substantial flow when the pressure in the line exceeds a predetermined safe limit, which is well above the normal pipeline pressure. When the valve opens, it diverts to a closed receptacle, that quantity of liquid which is necessary to prevent the pressure from exceeding said predetermined limit. Hence, in the event of the surge, much of the pressure is absorbed in the liquid and pipe, and just that quantity of liquid which is necessary to relieve pressures of unsafe proportions is discharged to the closed receptacle. The receptacle is pre-charged with a gas to cushion the impact of the surge and also includes means to dissipate energy of the liquid surge and to bring the liquid to a state of quiescence as quickly as possible. A return duct evacuates the reservoir to the pipeline when the surge subsides.

26 Claims, 10 Drawing Figures

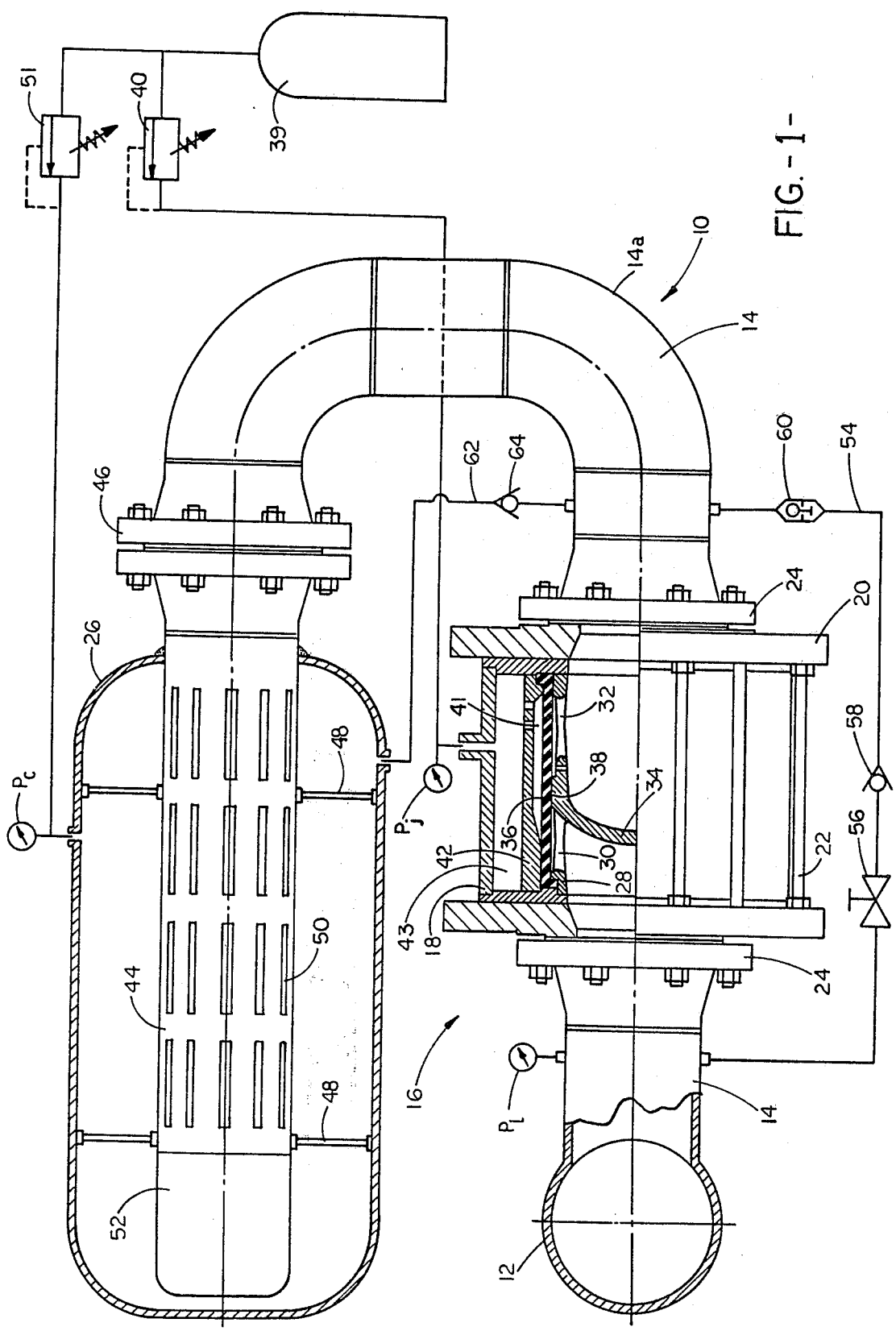
FIG.-1-

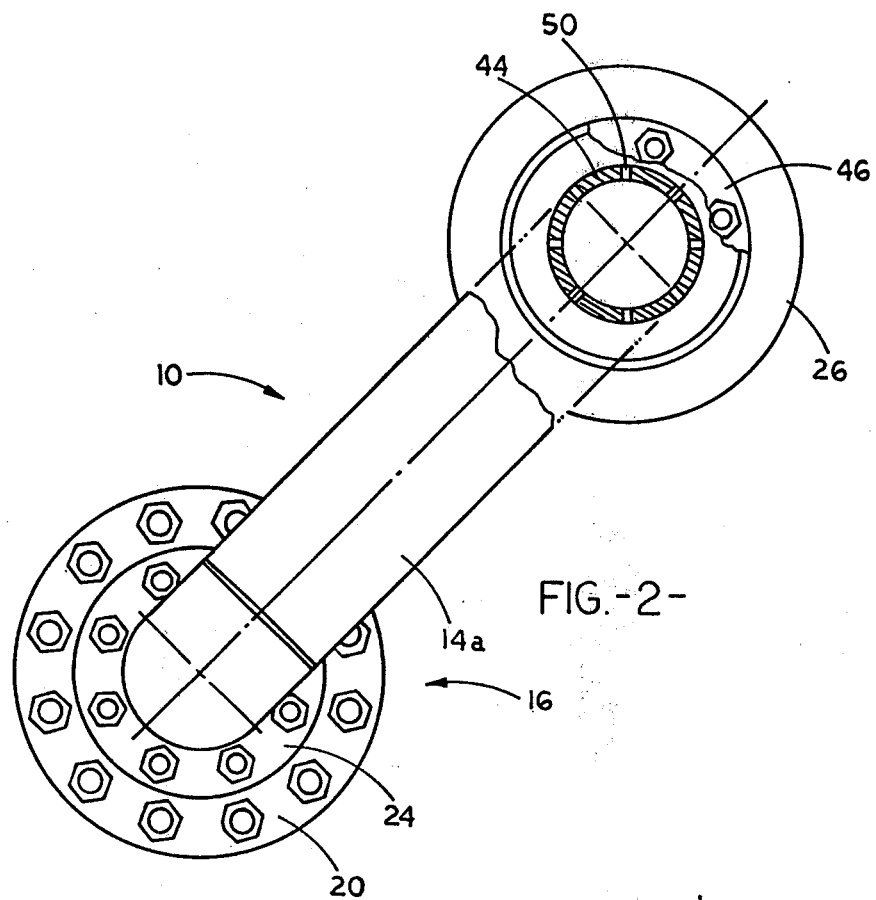
FIG.-2-
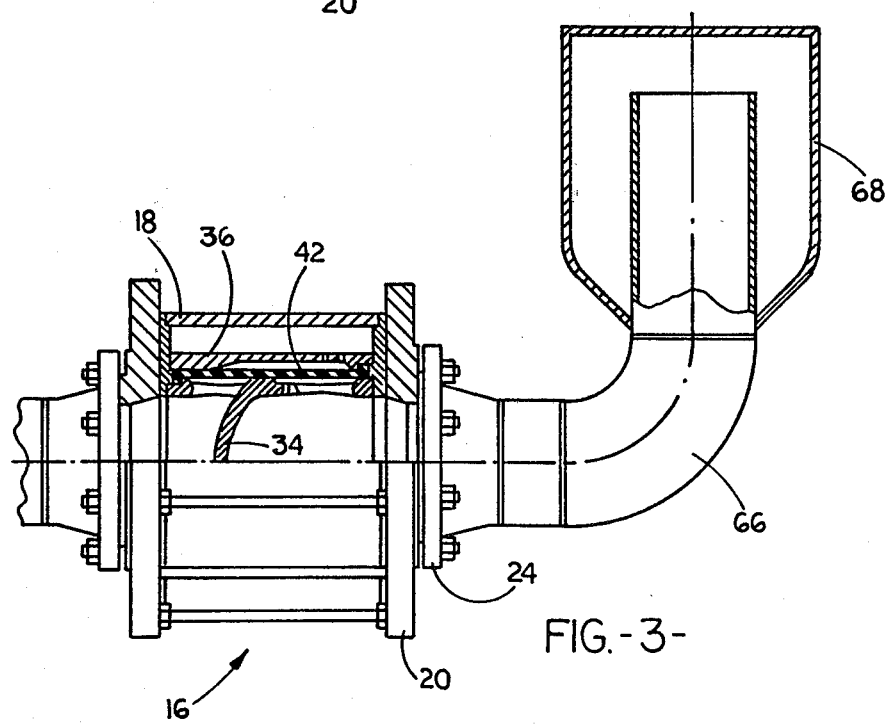
FIG.-3-

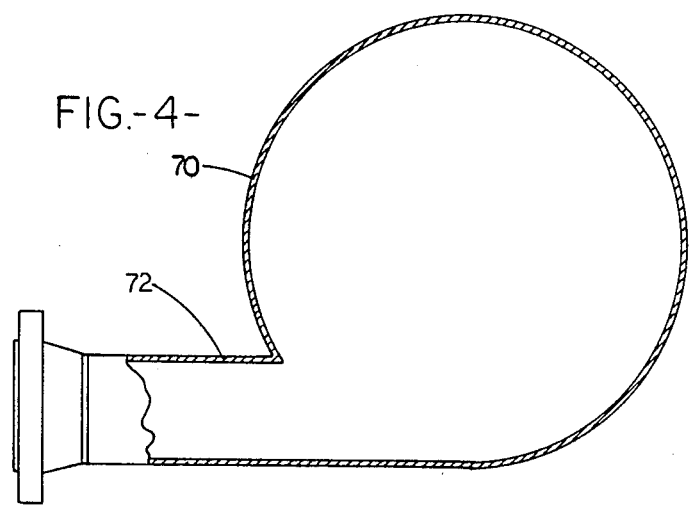
FIG.-4-
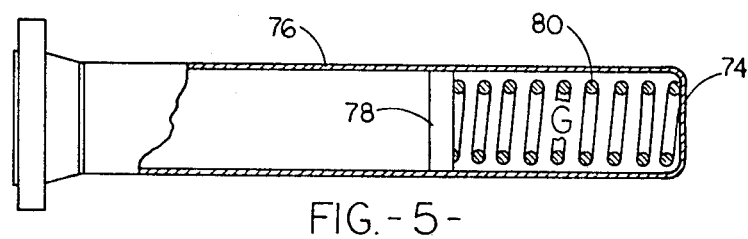
FIG.-5-
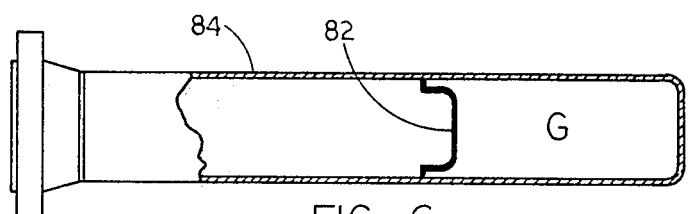
FIG.-6-
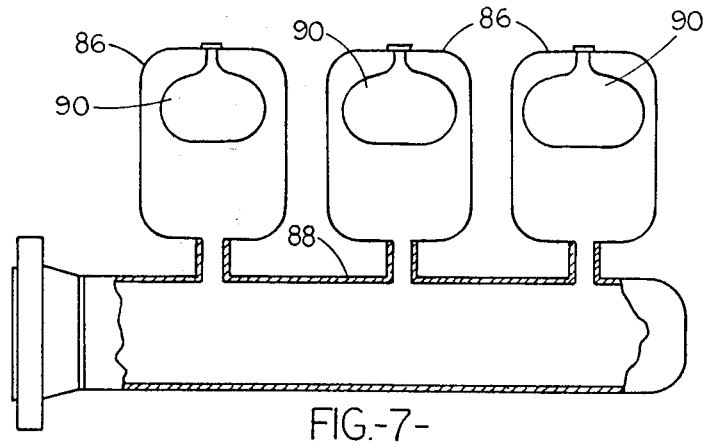
FIG.-7-

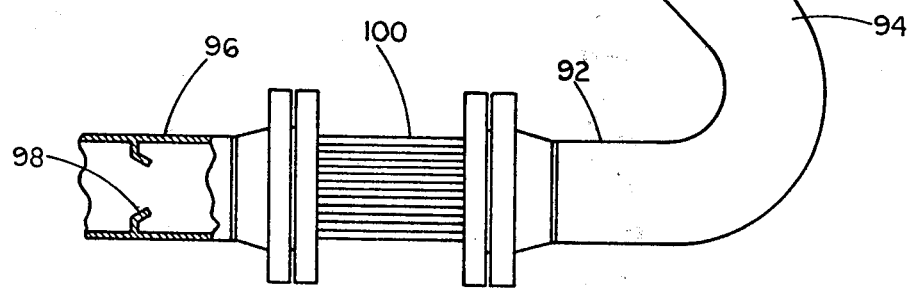
FIG.-8-
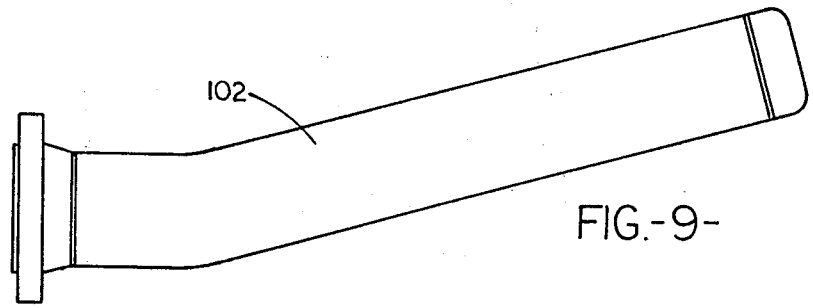
FIG.-9-
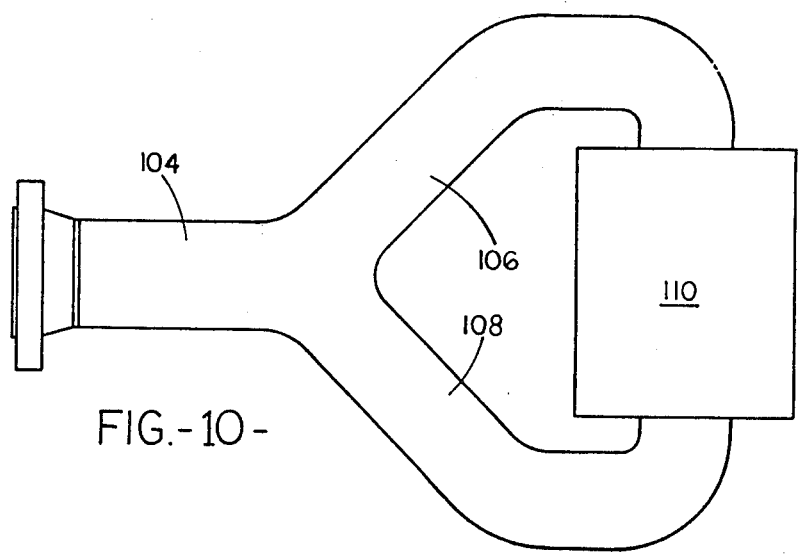
FIG.-10-

ENERGY DISSIPATING PIPELINE SURGE RELIEF SYSTEM

RELATED APPLICATION

This application is a continuation-in-part of our co-pending application Ser. No. 80,074 filed Sept. 28, 1979 now abandoned for "Pressure Surge Relief System".

BACKGROUND OF THE INVENTION

Severe pipeline damage could result from pressure surges in a liquid pipeline, which could occur when there is any sudden change in velocity of the liquid, as when starting or stopping a pump. Such surges have been relieved in some instances by operation of valve which open whenever they occur. Since many pipeline surges never reach dangerous levels, the diversion of liquid at every occurence is a needless waste and may require a reservoir of enormous capacity. Particularly where a closed tank is required, this could be very costly.

OBJECTS OF THE INVENTION

It is an object of this invention to provide a liquid surge relieving system which operates to relieve only those pressure surges which are beyond a limit to be safely accommodated by the pipeline.

It is a further object of this invention to provide a surge relieving system which provides controlled flow from the pipeline of a quantity of liquid which is then brought to a controlled stop.

It is a further object of this invention to provide a pipeline surge control system which diverts just that quantity of liquid necessary to eliminate the dangerous peak of a pipeline surge and then dissipates the energy of that quantity of liquid.

It is a further object of this invention to provide a complete surge relief system which is compact in construction and which may be installed as a unit.

Other objects and advantages of this invention will become apparent from the description to follow, particularly when read in conjunction with the accompanying drawing.

BRIEF SUMMARY OF THE INVENTION

In carrying out this invention, there is provided for a liquid pipeline, a surge relief valve, which may be of the type having a flexible tube which is constricted around a circular barrier by hoop tension and by pressure of a surrounding pilot gas. When the surge relief valve is opened, the pipeline liquid is diverted through the relief pipe to a closed receptacle which is pre-charged by a gas at a pressure level sufficient to cushion the impact and, as is desirable in some cases, to maintain the fluid in liquid state. Means are provided within the closed receptacle to dissipate the energy of the surging liquid and bring it to a controlled stop as soon as possible.

In operation of the system, the pilot gas is set at a predetermined pressure level which is well in excess of normal pipeline pressure, but within the range that can safely be handled by the pipeline. Hence, pipeline liquid is diverted to the closed receptacle only in the event of dangerous surges, and only in a volume to prevent the surge from generating the pressure peak which exceeds the safe design level. In a preferred embodiment, the relief line is connected to a pipe within a closed receptacle, which pipe has a plurality of apertures along its length through which the liquid flows as it moves along. When the surge has passed, and pipeline pressure subsides, a return line returns the liquid so diverted to the pipeline.

BRIEF DESCRIPTION OF THE DRAWING

FIG. 1 is a more or less schematic view of the surge relief system of a preferred embodiment;

FIG. 2 is an end view of the system assembly;

FIGS. 3 to 10 illustrate other embodiments of this invention.

DESCRIPTION OF PREFERRED EMBODIMENTS

Embodiment of FIGS. 1 and 2

Referring now to the drawing with greater particularity, the surge relief system 10 of this invention is adapted for operation in conjunction with a liquid transporting pipeline 12, and is installed in a branch or surge relief line 14 in open communication therewith. Surges frequently occur when the flowing liquid is subjected to sudden changes in flow conditions, as when a pump (not shown) is activated or deactivated. When such surges exceed a predetermined designed pressure level of safe pipeline operation, the system 10 is conditioned to relieve them.

The pressure is relieved through a valve 16, which is biased toward open position by pressure of liquid in the pipeline, and may be of the expansible tube type, such as is that shown in Bryant in U.S. Pat. No. 3,272,470, granted Sept. 13, 1966. Specifically the surge relief valve 16 may comprise a cylindrical body shell 18, which is clamped between two closure plates 20, as by means of studs 22. The closure plates are, in turn, secured by a conventional means to complementary flanges 24 in the pipeline branch 14 with the output thereof directed to a storage reservoir 26.

A slotted core 28 is carried within the valve body 18 and includes spaced, circumferential rows of inlet and outlet slots 30 and 32 on opposite sides of an intermediate barrier 34. A flexible, expansible tube 36 is stretched around the cylindrical sealing surface 38 of the barrier, normally to prevent flow from the slots 30 to the outlet slots 32. A gas, such as Nitrogen from a suitable source 39, is regulated by a regulator 40 to a predetermined pressure $P_j$ to be maintained in the jacket 41 surrounding the expansible tube 36. The jacket pressure $P_j$ is well above normal pipeline pressure $P_1$, but within the safe design limits of the pipeline, and will enable the valve 16 to open and relieve a surge when that pressure is exceeded. A restraining sleeve 42 with perforations therein limits the expansion of the rubber tube 36, while the spaceous chamber 43 around the sleeve provides plenty of volume for compression of the control gas, whereby the surge relief valve 16 will open quickly to pipeline pressure asserted against the interior of the flexible tube 36 when it reaches a level which is in excess of the jacket pressure $P_j$.

Extending into the reservoir 26 is an energy-attenuating tube 44, which is connected directly to the branch line 14, as by a suitable flange connection 46. The attenuating tube 44 is preferably centered within the reservoir 26, as by means of arms 48, and is provided with several rows of apertures, which may be in the form of slots 50, spaced arcuately around the cylindrical surface thereof.

As shown in FIG. 2, the surge relief pipe 14 has a U-bend between the relieving valve 16 and the closed receptacle 26 and, for greater accessibility, the axis of the reservoir 26 is displaced from the vertical plane of the axis of the valve 16. The U-bend dissipates some energy of the diverted liquid by imposing friction losses on it; the rapid reversal tends to equate thrust forces; and the bend enables a more compact structure. In addition, the centrifugal force tends to throw the liquid to the outside wall of the pipe. This, together with the laying over of the relief pipe 14 at an angle tends to generate a rotation in the stream and elongation of the rapidly moving front, converting the "piston slug" to a wedge.

It is highly desirable to have more slot area in the sparge tube 44 than is needed to accommodate maximum liquid flow, so that gas is drawn into the sparge tube 44 to reduce the pressure of the fluid, creating a greater pressure differential to increase flow from the valve 16.

In any event, when the surge relief valve 16 opens, the diverted liquid flowing into the sparge tube will flow, drop and be projected, through the apertures 50 whereby energy thereof is attenuated until it reaches a state of quiescence in the reservoir 26.

In addition, the reservoir 26 is precharged with a gas, such as air or nitrogen, from the source 39, regulated by regulator at 51 to a predetermined pressure level $P_c$ to cushion the impact of the arriving waves and, in the case of some liquids such as a volatile liquid, to maintain a pressure sufficient to prevent it from becoming gaseous. The closure cap 52 at the end of the attenuator tube 44 entraps gas in the imperforate end portion to provide a further cushion.

The surge relief system 10 is designed to relieve only dangerous surges; most surges will be accommodated in the pipeline itself. Even with dangerous surges, only that amount of pipeline liquid is diverted to the reservoir 26 which is attributable to that portion of the surge beyond the safe limits of the pipeline, taking into consideration a margin of safety. That is, if it is determined that the pipeline can safely handle pressures at a given level though well above normal pipeline pressures, the surge reliever 16 is set so that it will not open until that level is reached. Then, only that volume of liquid necessary to contain the peak pressure within a safe design level needs to be accommodated in the attenuation tube 44 and cushioned by the precharge pressure $P_c$, which is determined by pipeline design parameters, and may be atmospheric pressure or higher.

Particularly with the loop 14a in the branch line 14 disposing the reservoir 26 adjacent to the surge relief valve 16, the entire system 10 is extremely compact and may be assembled and shipped on a single platform or skid (not shown).

After a surge is attenuated and subsides in the pipeline 12, it is desirable to restore the capability of the system 10 and transfer diverted liquid from the reservoir back to the pipeline 12 in order to return the reservoir to full, or near-full, capacity. For this purpose, a small return line 54 is provided with an on-off valve 56 in the event that it is desired to monitor the return manually. In addition, or in the alternative, a simple check valve 58 may be installed in the line for automatic liquid return when pressure in the reservoir and branch line 14 downstream of the surge relief valve 16 exceeds that in the pipeline 12 after the surge subsides. In either event, since the liquid in the reservoir 26 and branch line 14 augmented by the compressed gas cushion, is usually well above pipeline pressure, it will return to the pipeline 10 without need of a pump when pressure therein subsides, to normal or near normal level. With the automatic liquid return enabled by the check valve 58, a float valve 60 is also provided so that, when liquid ceases flowing, it will close to prevent loss of the precharged gas in the chamber 26.

For complete drainage of the reservoir 26, a liquid drain line 62 is opened from the bottom of the reservoir 26 with a check valve 64 or the like provided to effect flow.

The Embodiment of FIG. 3

In this embodiment, the surge wave is relieved by directing a quantity of liquid from the surge relief valve 16, through relief pipe 66, the energy of the liquid as so diverted is attenuated by impacting in a jet against the end of a cylindrical tank 68. An obvious disadvantage of this embodiment resides in the unidirectional thrust imposed on the system by the impacting jet.

The Embodiment of FIG. 4

Unidirectional thrust can be avoided by directing the jet tangentially of the cylindrical tank 70. This generates a swirling mass around the tank 70, dissipating energy while avoiding jet impact. If the relief pipe 72 is located near the top of the tank 70, the liquid will follow a generally spiral path until it reaches the bottom.

The Embodiment of FIG. 5

In FIG. 5, the gas or buffer G contained in the closed end 74 of the energy dissipating chamber 76 is separated from the liquid in the surge by means of a piston 78 or the like. This would avoid gas entrainment in the liquid and resultant loss of the cushioning gas when the liquid is returned to the pipeline. The energy of the diverted flow is dissipated in compressing the gas on the opposing side of the piston 78. If desired, the gas cushion may be augmented or replaced by a spring 80.

The Embodiment of FIG. 6

Here, energy is again attenuated by compressing a gas G which is separated from the pipeline liquid by a diaphragm 82 sealed across the closed chamber 84. In addition, the diaphragm may be elastic to further dissipate energy in stretching.

The Embodiment of FIG. 7

In this embodiment, a series of accumulators 86 open to the closed chamber 88, each with a bladder 90 or the like charged with a gas under pressure. Hence, the surging liquid flows into the accumulators 86 to compress the gas in the bladders 90, thereby dissipating energy. In addition, the chamber 88 may be pre-charged with a cushioning gas.

The Embodiment of FIG. 8

In this case the energy is attenuated by providing the closed chamber 92 with a series of bends 94 which impose friction losses on the diverted liquid. In addition the chamber may be of progressively increasing cross-section to further dissipate energy.

Also as shown in FIG. 8 the system of this invention is not limited to an expansible tube valve, as illustrated in FIG. 1, and any embodiment shown will operate with any flow blocking device that opens at a predetermined pressure level. For example, a device 96 with a rupture disc 98 which ruptures at a given pressure to allow full flow will answer the needs of the system. However, without the expansible tube of FIG. 1 to modulate the flow, some other means, such as a bundle of tubes 100 to impose friction losses may be required to lessen the impact against the closed chamber 92.

The Embodiment of FIG. 9

In this embodiment the closed chamber 102 is angled upward so that impact of the surging liquid is with a sloping wall. This has much the same effect as the dissipation of ocean waves breaking up on a beach.

The Embodiment of FIG. 10

Finally, the FIG. 10 embodiment overcomes the disadvantage of unilateral thrust by forming the closed chamber 104 as a "Y" to divide the stream at 106 and 108, to jet two streams into a tank 110 from opposite directions, to produce a mutually cushioning effect.

While this invention has been described in conjunction with preferred embodiments thereof, it is obvious that other modifications and changes may be made by those skilled in the art without departing from the spirit and scope of this invention, as defined by the claims appended hereto.

What is claimed as invention is:

1. A closed pressure surge relief system for a liquid transporting pipeline comprising:
    a surge relief line adapted for connection at one end of a pipeline;
    a surge relief flow-blocking member in said relief line near the upstream end thereof;
    said member being conditioned to open quickly to large capacity flow when the pressure of fluid in said relief line reaches rises to a predetermined, fixed safe limit level above normal pipeline pressure and to close when said pressure drops to said safe level, thereby isolating a volumetric quantity of liquid from said pipeline;
    means for modulating flow through said members;
    a closed receptacle connected to the other end of said relief line;
    said surge relief line and said closed receptacle being of sufficient volume to accommodate said isolated quantity of liquid;
    means in said receptacle to stop flow smoothly;
    a return line connected to said surge relief line and adapted for connection to said pipeline; and
    a valve in said return line.

2. The pressure surge relief system defined by claim 1 wherein:
    said relief line and receptacle are relatively free of friction members which would create a back pressure to impair operation of said flow-blocking member.

3. A closed pressure surge relief system for a liquid-transporting pipeline comprising:
    a surge relief line adapted for connection at one end to a pipeline;
    a surge relief flow-blocking member in said relief line near the upstream end thereof;
    said member being conditioned to open quickly to large capacity flow when the pressure of fluid in said relief line reaches rise to a predetermined, fixed safe level above normal pipeline pressure and to close when said pressure drops to said safe level, thereby isolating a volumetric quantity of liquid from said pipeline;
    means for modulating flow through said member;
    a closed receptacle connected to the other end of said relief line;
    said surge relief line and said closed receptacle being of sufficient volume to accommodate said isolated quantity of liquid;
    a U-bend in said relief line between said flow-blocking member and said receptacle; and
    means in said receptacle to stop flow smoothly.

4. The pressure surge relief system defined by claim 1 or 3 wherein said receptacle comprises:
    a generally cylindrical, closed tank;
    said other end of said relief line extending into said tank along the axis thereof;
    a discharge opening at the downstream end of said relief line.

5. The pressure surge relief system defined by claim 1 or 3 wherein said receptacle comprises:
    a generally cylindrical tank; and including:
    a discharge opening at the downstream end of said relief line directed along a tangent of said tank.

6. The pressure surge relief system defined by claim 5 wherein:
    said downstream end of said relief line is disposed adjacent one end of said cylindrical tank.

7. The pressure surge relief system defined by claim 1 or 3 wherein:
    the other end portion of said relief line extends into said receptacle; and
    a plurality of perforations in said relief line within said tank.

8. The pressure surge relief system defined by claim 7 wherein:
    the downstream extremity of said other end portion is imperforate over a portion of its length so that liquid flowing therein entraps a volume of impact-cushioning gas.

9. The pressure surge relief system defined by claim 7 wherein:
    the total area of said perforations is greater than needed to accommodate liquid flow therethrough so that gas is drawn therethrough.

10. The pressure surge relief system defined by claim 7 wherein:
    said perforations comprise a series of slots around, and along the length of, said other end portion.

11. The pressure surge relief system defined by claim 10 including:
    means closing off the end of said other end portion within said closed receptacle.

12. The pressure surge relief system defined by claim 10 wherein:
    said receptacle is generally cylindrical; and
    said other end portion of the relief line extends along the axis thereof;
    said receptacle axis being displaced from the vertical plane of the axis of said flow-blocking device.

13. The pressure surge relief system defined by claim 1 or 3 including:
    a charge of gas under pressure contained in said receptacle.

14. The pressure surge relief system defined by claim 3 wherein:
    the axis of said receptacle being displaced from the vertical plane of the axis of said flow-blocking member.

15. The pressure surge relief system defined by claim 1 wherein:

said receptacle is formed of progressively larger cross-section.

16. The pressure surge relief system defined by claim 1 wherein:
said receptacle extends in a plurality of bends to cause multiple direction changes in fluid flowing therein.

17. The pressure surge relief system defined by claim 1 wherein:
said receptacle is elongated and upward sloping so that fluid flowing therein impacts against a sloping wall.

18. The pressure surge relief system defined by claim 1 including:
a pressure-responsive member movable in said receptacle and exposed to impact by fluid surging in said relief line; and
yieldable means biasing said pressure-responsive member in opposition to said impact.

19. The pressure surge relief valve defined by claim 18 wherein said pressure-responsive member comprises:
a bladder in said receptacle; and said yieldable means comprises;
a gas under pressure.

20. The pressure surge relief valve defined by claim 18 wherein said pressure-responsive member comprises:
a piston member slidable in said receptacle.

21. The pressure surge relief system defined by claim 3 including:
a return line connected to said surge relief line and adapted for connection to said pipeline; and
a valve in said return line.

22. The pressure surge relief system defined by claim 1 or 21 wherein:
said valve is a check valve conditioned to enable flow automatically in one direction only toward said pipeline.

23. The pressure surge relief system defined by claim 22 including:
a float check valve conditioned to enable flow of liquids only in said one direction.

24. The pressure surge relief system defined by claim 1 or 3 wherein said flow blocking member comprises:
an expansible tube valve including a circular barrier extending across a flow passageway;
an expansible tube stretched around said barrier; and
a control pressure fluid around said tube so that said tube stretches away from said barrier to allow flow when pressure in said relief line overcomes said control pressure.

25. The pressure surge relief valve defined by claim 24 wherein:
said control pressure is set at a level well above normal pipeline pressure but within safe limits of the pipeline.

26. The pressure surge relief system defined by claim 1 or 21 wherein:
said return line is connected from a lower area of said closed receptacle to enable drainage thereof to restore the capacity thereof.

* * * * *